United States Patent [19]

Stähle

[11] 4,176,686
[45] Dec. 4, 1979

[54] FLOW CONTROL VALVE FOR LIQUIDS

[75] Inventor: Kurt Stähle, Neuhausen-Steinegg, Fed. Rep. of Germany

[73] Assignee: Concordia Fluidtechnik GmbH, Fed. Rep. of Germany

[21] Appl. No.: 961,927

[22] Filed: Nov. 20, 1978

Related U.S. Application Data

[63] Continuation-in-part of Ser. No. 890,309, Mar. 27, 1978.

[30] Foreign Application Priority Data

Nov. 19, 1977 [DE] Fed. Rep. of Germany ........ 2751775

[51] Int. Cl.² ........................................... F16K 19/00
[52] U.S. Cl. .................................. 137/604; 137/216; 239/428.5; 251/331
[58] Field of Search .................. 137/216, 604; 239/419.5, 428.5; 251/331

[56] References Cited

U.S. PATENT DOCUMENTS 3,273,866  9/1966  Lancy ........................... 137/216 X
3,426,798  2/1969  Chernak ....................... 251/331

FOREIGN PATENT DOCUMENTS 60490 12/1942 Denmark ................................. 137/216
2021715 11/1971 Fed. Rep. of Germany ........ 239/428.5
910694 11/1962 United Kingdom ..................... 137/216

Primary Examiner—Robert G. Nilson
Attorney, Agent, or Firm—Craig and Antonelli

[57] ABSTRACT

A flow control valve is provided, especially for controlling the flow of water heated to near its boiling point. In order to limit cavitation and improve sealing characteristics of the valve, the valve seat is formed as an integral part of a plastic valve housing, on a thin inwardly protruding plate. The closure element or sealing body is formed of an elastomeric material stretched over a support plate, in turn attached to a movable plunger of, for example, an electromagnetic operated valve plunger. The closure element is formed as a tapered conical member which engages, with its tapered peripheral surface against the seating plate. Preferred embodiments of the invention relate to valve arrangements having an annular ventilating slit formed to open immediately downstream of the throttling point of the valve.

17 Claims, 9 Drawing Figures

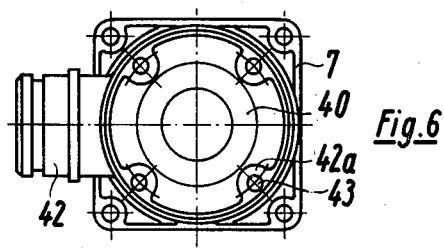
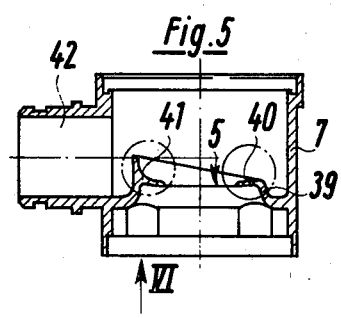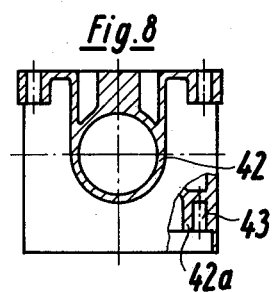
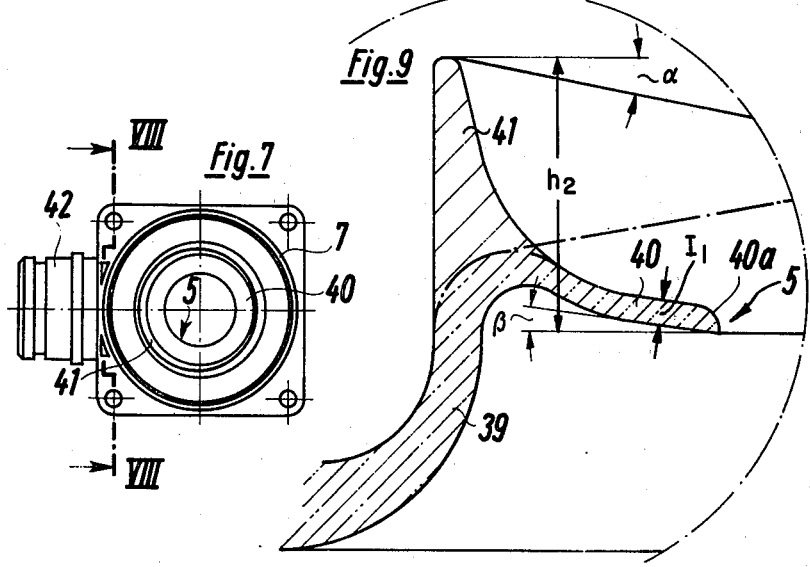

FLOW CONTROL VALVE FOR LIQUIDS

BACKGROUND AND SUMMARY OF THE INVENTION

This is a continuation-in-part application of my copending application Ser. No. 890,309, filed Mar. 27, 1978. The contents of said application Ser. No. 890,309 are hereby incorporated herein by reference thereto, to aid in understanding the subject matter of the present application.

The invention relates to a flow control valve for liquids with temperatures close to their boiling point, especially for hot water apparatus, comprising a closure element cooperating with a valve seat which together with the valve seat constitutes a choke point, and in which in the direction of flow downstream of the narrowest flow cross section at the choke point there are ventilating openings, exposed to ambient pressure via an annular chamber, in the form of an annular gap that surrounds the choke point.

Flow valves of this type have already been proposed in my above-noted U.S. application Ser. No. 890,309. In these previously proposed valves, the upper edge of an inset nozzle in the valve housing is provided as a sealing edge, cooperating with a flat valve in the form of a tensioned diaphragm. It is true that thereby the upper edge of the valve seat can mechanically be kept free of calcium deposits, and with the ventilation gap it is likewise possible to prevent development of turbulence and low pressure beneath the valve seat, and thereby to prevent calcium deposits at this point. However, it has been found that on the inside of the narrowest flow cross section, i.e., immediately behind the valve seat, there still remains the risk of local vacuum and therewith of calcium deposition, and that with a predetermined stroke the quantity of flow does not remain constant.

The present invention therefore is related to the problem of producing an improved valve of the mentioned type which will exclude any deposition of calcium even on the inside of the flow cross section downstream of the valve seat.

To solve the above-noted problems, the present invention contemplates providing that the closure element be given an elastically yeilding tapered part, preferably a conical part, which cooperates with the inner edge of a seating plate that extends inward from the annular gap and is as thin as practically possible. With this design, the ventilation will be applied as closely as possible to the seal line of the valve seat so that right there a deposition of calcium will be prevented. At the flow point, the inner edge of the valve body will be automatically kept free of calcium deposits so that in the narrowest cross section in any case calcium deposits will be prevented, and with a predetermined stroke the desired flow quantity will be ensured.

It is very advantageous according to an especially preferred embodiment of the invention to utilize a stretched diaphragm for the conical body, thereby providing a cap-shaped configuration for the valve body which has a cone tip; and an annular cavity remains between this conical tip and a plate connected with the drive, over which the elastic diaphragm is then conically stretched. With this design, the diaphragm is drawn far over the inner edge of the valve seat and thereby also mechanically ensures that the valve seat will remain free of any calcium deposit. These embodiments offer the advantage that a rubber elastic cap can also be made as a roll diaphragm that can be tensioned tightly between the drive, especially an alectromagnet part, and the actual valve housing. Thereby, the electromagnet part will be entirely closed off from the liquid flowing through. This embodiment can also be made for lower pressures.

It has proved to be advantageous according to preferred embodiments to surround the seating plate by a breaker edge which is higher toward the inflow opening than it is on the opposite side, because then there is uniform flow at the valve seat which does not produce a somewhat unequal flow profile caused by the inflow energy, which could give rise once again to localized vacuum formation. It is also advantageous to incline the seating plate itself at a slight angle to a plane perpendicular to the flow axis, in the flow direction, and it has been found that then—apparently because of better ventilation through the annular gap, and counter to expectations—good flow conditions occur that lead to no undesired development of turbulence behind the valve seat.

These and other objects, features and advantages of the present invention will become more apparent from the following description when taken in connection with the accompanying drawings which show, for purposes of illustration only, one embodiment in accordance with the present invention.

BRIEF DESCRIPTION OF THE DRAWINGS

FIG. 5 is a longitudinal sectional view of the valve housing part with the seating ring of the FIG. 1 valve;

FIG. 6 shows the housing part of FIG. 5 as seen in the direction of arrow VI in FIG. 5;

FIG. 7 is a top view of the housing part of FIG. 5;

FIG. 8 is a sectional view along line VIII—VIII of FIG. 7; and

FIG. 9 is an enlarged partial representation of the left side of the seating plate, with part of the encircling breaker edge of the valve of FIG. 1.

DETAILED DESCRIPTION OF THE DRAWINGS

Figures 1, 2:
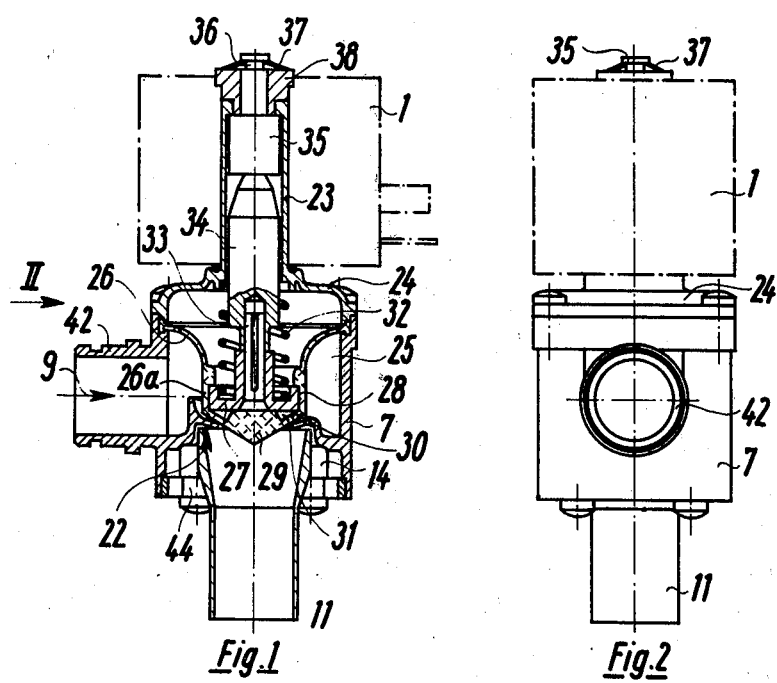
FIG. 1 is a side partial cross-sectional view through a flow control valve constructed in accordance with a preferred embodiment of the present invention.
FIG. 2 is a view of the valve of FIG. 1, seen in the direction of arrow II.

It can be seen from the figures that the new flow valve has a magnet part 1 which is fixedly seated on tubular extension 23 of a housing cover 24, disposed on valve housing 7. Valve housing 7 has an inner chamber 25 into which liquid flows in the direction of arrow 9. Between cover 24 and valve housing 7, the edge of a cap-shaped roll diaphragm 26 is tensioned: said diaphragm goes over into a cylindrical part 26a in which a plate 27 is tensioned in a corresponding recess. Plate 27 has a somewhat larger diameter than the corresponding untensioned inner diameter of a recess 28 in cylindrical part 26a of roll diaphragm 26. The cap-shaped roll diaphragm 26 extends radially outwardly from the cylindrical part 26a into a conical tip 29. Between conical tip 29 and cylindrical part 26a there remains a conical shell part 30, formed by a thin stretched membrane. In this way, an annular cavity 31 remains between plate 27 and the filled-out part of conical tip 29. Plate 27 bears via a spring 32 on the housing and is fixedly connected with plunger 34 of the electromagnet part 1 via a spline pin 33. Inside tube 23 of cover part 24 a reciprocal pole 35 is seated, at whose upper end a spring plate 37 is clamped in a groove 36 which holds a fastening ring 38; this holds the magnet part 1 fixedly on tube 23.

FIGS. 5 to 9 particularly show valve housing 7 without cover 34 and without inner pipe 11. A valve seat 5 is intergrally formed with valve housing 7, formed of a seating plate 40 that extends inwardly from an annular shoulder 39, said plate 40 having very thin walls. This seating plate 40 forms a ring on whose inner diameter seating edge 5 is formed (see FIG. 9) that sealingly cooperates with the conically tensioned diaphragm 30. Seating plate 40 is surrounded by a breaker edge 41 which is higher toward the side of inflow opening 42 than it is on the other side. Thereby the height of the breaker edge 41 is so selected that in the preferred embodiment shown, the angle $\alpha$ which the upper edge of breaker edge 41 assumes with respect to the horizontal is about 9° or 10°. (Projected angle of inclination of the upper edge from its high point at the side of inflow opening 42 to its low point at the diametrically opposite side of the sealing plate). Also, the surface of seating plate 40 is inclined somewhat with reference to the horizontal, so that angle $\beta$ between the horizontal and the lower edge of seating plate 40 is about 7°. The inner edge of seating plate 40 itself is rounded off so that in addition to the sealing action which occurs between diaphragm part 30 and the seating plate 40, there is likewise a mechanical cleaning action via the inner edge of the diaphragm that spans the seating plate.

Figure 3:
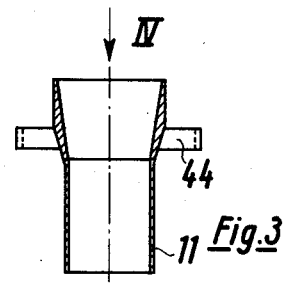
FIG. 3 is a sectional view of the discharge pipe set in the flow valve of FIG. 1.
Figure 4:
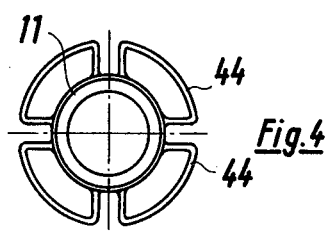
FIG. 4 is a top view of the discharge pipe of FIG. 3.

In valve housing 7 there are downward projections 42a which have threads 43 for screws which can be introduced into the intermediate spaces between crosspieces 44, with which inner pipe 11 is provided, for setting in valve housing 7. Inner pipe 11 itself runs conically inward from its upper edge and then is cylindrical, as best shown in FIGS. 1 and 3. Valve housing 7 is set in from below and held by the screws that have already been mentioned. Between pipe 11 and the part of the valve housing 7 that surrounds it, there thereby remains an annular space 14 through which annular gap 22 is connected with the outside. If the valve is opened, because of the vacuum existing behind valve seat 5, caused by the liquid flowing through, air will be sucked from the outside through annular gap 22, and in this way localized development of a vacuum with cavitation behind the valve seat will be avoided. The phenomena in this respect correspond to those of the valve design of the previously mentioned earlier proposal of my above-noted copending application.

The valve housing 7 and inner pipe 11 are made of plastic in particularly preferred embodiments of the invention. Roll diaphragm 26 is made as one piece with conical tip 29. A rubber elastic material is provided for this diaphragm 26 and tip 29; silicone rubber having been found to be an advantageous material according to preferred embodiments. The material thickness between tip 29 and the cylindrical part 26a, i.e. the thickness of the conically stretched membrane 30, is preferably in the range of 7 to 8 or 10 mm. In this construction, the diaphragm body at the seal line is soft, seals well and otherwise is applied well about the rounded seating edge 40a (shown in FIG. 9) of seating plate 40. In opening and closing the valve, there is a mechanical cleaning action which in contrast to the design of my above-identified copending application extends further into the flow cross section of the seat so that here the risk of calcium deposition will be avoided. This last-mentioned feature simply and advantageously improves on my mentioned prior design, because in such prior design, a flat-seat valve was utilized, which comes mechanically into contact only with the upper edge of the upstanding rim of the valve seat.

While I have shown and described several embodiments in accordance with the present invention, it is understood that the same is not limited thereto but is susceptible of numerous changes and modifications as known to those skilled in the art and I therefore do not wish to be limited to the details shown and described herein but intend to cover all such changes and modifications as are encompassed by the scope of the appended claims.

It is to be noted that the thickness of the seating plate 40, which is designed as $t_1$, is about 0,5 mm independent of the diameter of valve seat 5.

The height $h_2$ should be chosen so that the uppermost part of the breaker edge is in alignment with the axis of the inflow opening 42.

I claim:
1. Flow control valve for liquids, such as water or the like heated to near the boiling point; comprising:
  a sealing body,
  a valve seat which cooperates with the sealing body to form a throttling point,
  ventilating aperture means opening into the flow of liquid through said valve at a position downstream of the throttling point,
  said sealing body being formed as a closure element with an elastically yielding tapered part, said valve seat being formed as a relatively thin seating plate that extends inwardly from said aperture means and includes an inner edge which cooperates with the tapered part.
2. Flow control valve according to claim 1, wherein said tapered part is conically shaped.
3. Flow control valve according to claim 1, wherein said aperture means is in the form of an annular gap surrounding the throttle point and exposed to ambient pressure via an annular chamber, and wherein said valve includes a valve housing for said sealing body and valve seat.
4. Flow control valve according to claim 2, wherein said aperture means is in the form of an annular gap surrounding the throttle point and exposed to ambient pressure via an annular chamber, and wherein said valve includes a valve housing for said sealing body and valve seat.
5. Flow control valve according to claim 4, wherein the conical part is constituted by a rubber elastic diaphragm that is tensioned in the form of a conical shell.
6. Flow control valve according to claim 5, wherein the diaphragm is made as a cap with a conical tip which is applied to a support plate that is connected with a movable valve plunger, whereby the elastically yielding conical part borders on an annular chamber that remains between the cone tip and the support plate.
7. Flow control valve according to claim 6, wherein the support plate is tensioned in a cylindrical part of the cap-shaped diaphragm.
8. Flow control valve according to claim 7, wherein the support plate has a somewhat larger diameter than the inner diameter of the cylindrical part of the diaphragm that is stretched over it.

9. Flow control valve according to claim 8, wherein the cylindrical part is integrally formed into a roll diaphragm that is tensioned in the valve housing.

10. Flow control valve according to claim 4, wherein the seating plate is inclined at a slight angle ($\beta$) with reference to a plane perpendicular to the flow axis, in the flow direction.

11. Flow control valve according to claim 10, wherein said angle ($\beta$) is approximately 7%.

12. Flow control valve according to claim 10, wherein the seating plate is surrounded by an encircling breaker edge which is higher toward an intake opening of the valve housing of the valve than it is on the other side.

13. Flow control valve according to claims 10 or 12, wherein the seating plate is disposed somewhat higher than the floor of the intake opening space in the valve housing.

14. Flow control valve according to claim 4, wherein the annular gap is formed between the seating plate and an inset pipe that tapers inwardly conically from the annular gap.

15. Flow control valve according to claim 14, wherein the inset pipe is made of plastic and is set in the valve housing with crosspieces.

16. Flow control valve according to claim 6, wherein the support plate is braced on the valve housing by a spring and is connected by a splined pin with a plunger of an electromagnetic valve.

17. Flow control valve according to claim 9, wherein an electromagnet part is disposed on a part which can be set on the valve housing, said last-mentioned part serving at the same time for tensioning the roll diaphragm.

* * * * *